US012033200B1

(12) United States Patent
Hubman et al.

(10) Patent No.: US 12,033,200 B1
(45) Date of Patent: Jul. 9, 2024

(54) SYSTEM AND PROCESS FOR MASS CUSTOMIZATION AND INSTANT ON-DEMAND FORMULATION AND MANUFACTURING

(71) Applicant: AlpStories, Inc., Atlanta, GA (US)

(72) Inventors: Danijel Hubman, Litija (SI); Joze Pivk, Rovte (SI); Astrid Androsch, Atlanta, GA (US)

( * ) Notice: Subject to any disclaimer, the term of this patent is extended or adjusted under 35 U.S.C. 154(b) by 0 days.

(21) Appl. No.: 17/696,954

(22) Filed: Mar. 17, 2022

Related U.S. Application Data

(63) Continuation-in-part of application No. PCT/SI2021/050008, filed on Mar. 5, 2021.

(51) Int. Cl.
*G06Q 30/00* (2023.01)
*G06Q 30/0601* (2023.01)

(52) U.S. Cl.
CPC ............... *G06Q 30/0621* (2013.01)

(58) Field of Classification Search
CPC ................................. G06Q 30/0621
USPC ........................................ 705/26.5
See application file for complete search history.

(56) References Cited

U.S. PATENT DOCUMENTS

| 6,402,364 B1 | 6/2002 | Esclar et al. | |
| 8,933,994 B2* | 1/2015 | Gross | A61B 5/441 348/47 |
| 2005/0211768 A1* | 9/2005 | Stillman | G07F 17/00 235/381 |
| 2005/0240085 A1* | 10/2005 | Knoell | A61B 5/411 128/920 |
| 2006/0087915 A1 | 4/2006 | Koniezko | |
| 2013/0310955 A1* | 11/2013 | Minvielle | G05B 13/02 700/28 |
| 2014/0098629 A1* | 4/2014 | Greter | B01F 35/75425 366/184 |

(Continued)

FOREIGN PATENT DOCUMENTS

DE 19647617 A1 11/1996

OTHER PUBLICATIONS

He, Wei, Beauty industry gets high-tech makeover, Apr. 5, 2019, China Daily, International ed., 9. (Year: 2019).*

(Continued)

*Primary Examiner* — Jeffrey A. Smith
*Assistant Examiner* — Brittany E Bargeon
(74) *Attorney, Agent, or Firm* — GUGLIOTTA & GUGLIOTTA LPA

(57) ABSTRACT

A system for the mass production of "personalized" health and beauty formulations is provided that is then produced on-demand production thereof. A user selects specific personal or product attributes through an interactive selection process either online or at a retail location. An individual product recipe is then created from an interactive ingredient database, and a detailed production formulation is then enabling through an automated, on demand production cell in which ingredients are either sequentially or simultaneously dosed into an in-situ mixing container. Mixing of liquids occurs after the container is sealed and the same container provides the final user packaging. Manufacturing control, labeling, packaging and compliance traceability are all codified, tracked, traced and saved through the entire integrated selection and production system.

11 Claims, 2 Drawing Sheets

(56) References Cited

U.S. PATENT DOCUMENTS

| | | | | |
|---|---|---|---|---|
| 2014/0279792 A1* | 9/2014 | Hudson | ................. | G16H 20/60 |
| | | | | 706/46 |
| 2015/0009775 A1* | 1/2015 | Vogt | ................... | B01F 35/7137 |
| | | | | 366/76.1 |
| 2015/0021356 A1* | 1/2015 | Witchell | ............... | B01F 33/848 |
| | | | | 222/23 |
| 2016/0328772 A1* | 11/2016 | Hubman | ................ | H04N 5/772 |
| 2017/0154372 A1* | 6/2017 | Balooch | ................ | B01F 33/846 |
| 2017/0358019 A1* | 12/2017 | Shu | ........................ | G16B 50/30 |
| 2018/0075506 A1* | 3/2018 | Burkhard | ........... | G06Q 30/0635 |
| 2018/0189853 A1* | 7/2018 | Stewart | ................... | G07F 13/06 |

OTHER PUBLICATIONS

International Search Report, Applicatoin No. PCT/IS2021/050008.
International Search Report PCT/SI2021/050008.
Priority application PCT/SI2021/05008.

* cited by examiner

SYSTEM AND PROCESS FOR MASS CUSTOMIZATION AND INSTANT ON-DEMAND FORMULATION AND MANUFACTURING

RELATED APPLICATIONS

The present invention is a continuation of priority application PCT/SI2021/050008, filed on Mar. 5, 2021, incorporated by reference as if fully rewritten herein.

BACKGROUND OF THE INVENTION

1. Field of the Invention

This invention relates to the high-speed preparation, manufacturing and sale of health and beauty products and, more particularly, to the efficient mass production of "personalized" and "customized" formulation as and, even more particularly, to the on-demand production thereof.

2. Description of the Prior Related Art

Most health or beauty products (i.e., personal care, cosmetics, medicaments, vitamins, sports drinks, etc.) are designed, formulated and packaged in a manner targeted at large demographic cohorts of consumers. Whether based on physiology, such as sex, age, health or physical parameters, or simply personal subjective preference, the mass marketing of such products results in a single formulation for a cosmetic or health product for all users. For distribution in retail channels such as mass merchants, formulators of cosmetics products, for example, may "customize" their beauty product with only a few formulations (e.g., oily, dry, combination, acne prone, sun sensitive, sensitive, allergy tested, poor texture, large pores, etc.). When targeting a mass market, manufacturers must strike a balance between what is economically feasible for them relative to the quantity of products available in the market and the number of customers they can attract from the market.

Recent years have seen rapid and increasing growth in the direct-to-consumer channel where a brand sells their product to the end user. Facilitated through the internet via a direct website or an online platform (e.g., Amazon®, Shopify™, etc.), e-commerce has launched countless direct-to-consumer companies.

While growth in direct-to-consumer sales can and has facilitated the development of "made-to-order" products, such a model is not amenable to the current state of the art in the manufacture, marketing and sale of health and beauty segments.

Two impediments to a "made-to-order" model arise when formulating skincare or haircare products throughout the general population: a large and diverse population of skin and hair types for any given product claim made; and the incompatibility of existing manufacturing systems and methods to fulfil increasingly small population segments economically.

Several companies today are creating "personalized" products for customers. However, while such companies suggest that using self-reported answers about skin concerns or purported "algorithms" to recommend a personalized product to a particular user, the reality is that any such "personalized" recommendation is still selected from either an existing ready-made product portfolio (as such suggesting a specific regimen), or using self-reported answers about skin concerns to a small subset of product formulations advertises as "customized" hair or skin care formulations or, essentially, a very restricted and limited set of potential products, all of which have typically been created for the mass market or are "hand" formulated and/or "hand" prepared (mixed) in relatively small commercial batches. Traditional technology for supply chain management was designed to enable sales and manage production of a limited variety of products with clearly defined input components. Translating an individualized order from a single customer into a custom product is a major challenge and not merely an incremental improvement. Flexible manufacturing systems are essential to making small batch production for mass customization profitable. Automated manufacturing struggles to produce volumes smaller than 4 gallons for products with high viscosity such as creams. It therefore has to be completed with manual process steps; as such cannot achieve the profitability needed for taking it to commercial scale.

With most mass-production for such products located offshore such that it would take up to 12 months to get to consumer, and with limited production capabilities resulting from the currently hand-mixed batch techniques, such economic or production inefficiency make a customized order-to-production business model simply impossible or impractical. Further still, organic formulations, currently in high demand, are highly challenging for development and production since the existing impediments are further compounded by the use of natural preservatives, instability of formulations without the use of harsh preservative chemicals, and the short shelf live that such products tend to have.

There are several different systems and methods that are known for use in the preparation of cosmetic products in a shop or online according to a customer's wishes and needs. These include:

Japan patent JP2002073944 describes a marketing method that-connects a customer to a producer's server and allows the customer to provide information needed to make individualized cosmetics. In this way a relationship between customers and producers can be built. In addition, this process also improves control and management of production, supplies and customer information.

U.S. Patent Application Publication No. US2013084259 describes a method for production of individualized cosmetics where the customer selects ingredients of the cosmetic product according to his/her own wishes and skin characteristics.

Korean Patent KR20100062903 describes a method for cosmetics individualization, where the customer connects with a server, enters data about skin characteristics and personal information, and ingredients are selected for a cosmetic product according to customer's wishes, based on the data entered by the customer.

U.S. Patent Application Publication US2009076639 describes a method and system for cosmetics individualization based on skin or hair characteristics, wherein a microprocessor contains a database with information for standard mixing ratios depending on age and skin or hair characteristics.

And, U.S. Patent Application Publication US2005021174 describes a system for the selection and production of an individualized cosmetics product, either implemented on the internet or in an autonomous unit, such as a kiosk. The recipe for the cosmetic product is made based on customer's wishes and other external factors. The recipe is then sent to production. At the same time the customer receives the recipe for the created individualized cosmetic product.

However the above disclosures do not disclose methods of selecting, marketing or create a user customized product in a manner that facilitates the customized manufacturing of such a product. Such existing art fails to provide the solution for individualized customization at scale and prevents the next wave of mass customization—building a unique product for each customer. While a demand in the marketplace exists, a solution has been elusive that is capable of achieving profitably at scale.

Empowered by social networks and their digital devices, consumers are increasingly dictating what they want, and when and where they want it. Today's consumers are seeking out brands that allow them to customize everything about a product, down to its formulation. As such, they have become creators, demanding more personalized products and expecting to be given the opportunity to shape the products they consume.

According to Mckinsey & Company: "Profitable mass customization of products—whether they are ones that are unique for each customer or ones that consumers can configure extensively to their needs—requires success in two broad areas. The first is identifying opportunities for customization that create value for the customer and are supported by smooth, swift, and inexpensive transactions for both consumers and producers. The second is achieving a manageable cost structure and cost level for the producer even as manufacturing complexity increases."

Traditional technology for supply chain management was designed to enable sales and manage production of a limited variety of products with clearly defined input components. Translating an individualized order from a single customer into a custom product was a big challenge. Flexible manufacturing systems are essential to making small batch production for mass customization profitable.

Personalization rose to prominence with the advent of digital and modern technology. Businesses have not only developed the capabilities to measure specifically what each individual consumer wants; they can now also link their processes and resources to provide it. However, the businesses have invested heavily in developing advanced marketing capabilities. These include personalizing communications and campaigns and geographical personalization.

While these investments have helped to achieve improved response rates from consumers, there is still more that can be done to capture a consumer's attention and increase his or her spending and loyalty.

Manufacturing solutions that can be combined with a digital design tool are driving the dramatic increase in mass customization of products. A true made to order product (bespoke) required the consumer/customer to be involved from the beginning to the end of the process to create a unique product.

Consequently, a need exists for the "personalization" of formulations for the on-demand, mass production of health and beauty products.

SUMMARY OF THE INVENTION

Objects of the present invention include providing for or facilitating of the mass manufacturing of customized, "personalized" products.

It is a feature of the present invention to allow for the actual "personalization" of a product formulation for use in production.

It is another feature of the present invention to allow for the economically efficient mass production of such personalized product formulations.

It is yet another feature of the present invention to allow for on-demand production of said personalized product formulation.

Briefly described according to the preferred embodiment of the present invention, the system, devices, and processes herein are used to design and prepare individualized, customized cosmetics and their respective branding according to predetermined instructions or a user's instructions. The system allows for a scalable business making customized products using a large number of ingredients. Autonomous on-demand production allows for high-speed customization without the need for human intervention and enable made-to-order formulae that are affordable and a business that can be scaled benefiting the consumer as well as the beauty industry and other related industries. A flexible, scalable and autonomous on-demand production for made-to-order cosmetics and health products allows for a unique formula for each single consumer and/or private label customer that is manufactured in time to enable a wave of mass-customization. A complete end-to-end technology solution for made-to-order health and beauty care products for the consumer who may mix their own formula to create a customized beauty and/or health product for their individual needs. In addition, flexibility of a complete end-to-end technology solution for private label customers for rapid formulation, design and creation of products and product portfolio, order management and on-demand manufacturing without minimum order quantities. Thus, providing a holistic supply chain solution that eliminates costs of inventory and price competition while enabling a more personalized service that drives consumer/customer loyalty.

The present invention integrates two technology solutions. The first is a robotic cell to enable mass customization of, for example, cosmetics, health products and the like. Such integration allows for the autonomous management of production, precise mixing of ingredients, and automated filling and branding. The second includes an advanced algorithm that enables consumers and private label customers to create their custom products via a smart factory. By analyzing individual skin, hair, nutritional and health needs, millions of formula variations may be created depending on ingredients, concentration and individual needs. The process automation and algorithm manage level of concentration and ratio between ingredients and the robotic system that quickly blends ingredients in an economical manner while fully automating the process of ordering, filling and labeling of cosmetic and health products, each in small volume customized for a consumer and/or customer.

The present invention facilitates consistent quality, increased speed and profitability of accurately formulated personal products with reduction/elimination of waste of product and without the need for the significant quantities of water for cleaning of delivery systems. Further, a packaging system having an integrated mixer is utilized in production through the finished, retail product. When such packaging is filled with base and additives, the packaging is closed, and mixing will be carried out by the integrated mixer within the packaging/bottle.

It is an advantage of the present invention to facilitate the selection of a customized personal care and health product.

It is another advantage of the present invention to facilitate the mass production of "personalized" and "made-to-order" formulations.

It is yet another advantage of the present invention to accommodate on-demand such personalized formulations.

It is yet another advantage of the present invention to facilitate high-speed on-demand production of liquid or non-liquid products at a mass production scale.

Other advantages of the present invention include decreasing complexity and length of a product's supply chain.

Still a further advantage of the present is decreasing of product waste in the production or dispensing.

Yet further advantages of the present invention facilitate small volume dosing and micro dosing of formulation ingredients.

Yet a further advantage of the present invention is to allow for rapid reconfiguration and flexibility of systems to enable high speed manufacturing (serial production) wherein every single product being produced may have a different formula.

Further, the present invention is adaptable to liquid, cream and powdered ingredients, and can fill retail packaging in multi-dose bottles, capsules, pills or single use pods.

Further object, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
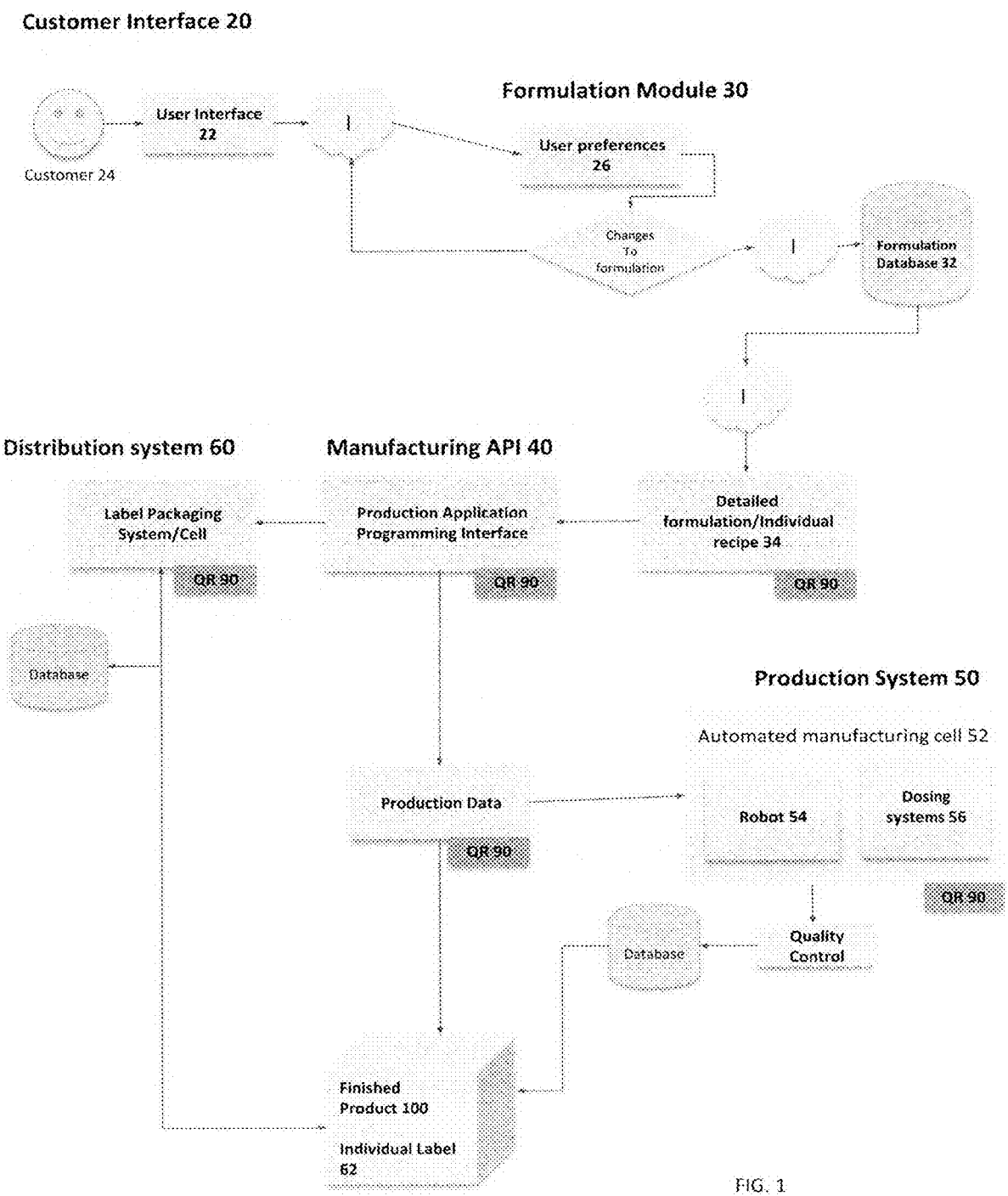
FIG. 1 is a schematic for the system architecture of an improved method for the preparation and sale of health and beauty products according to the preferred embodiment of the present invention.
Figure 2:
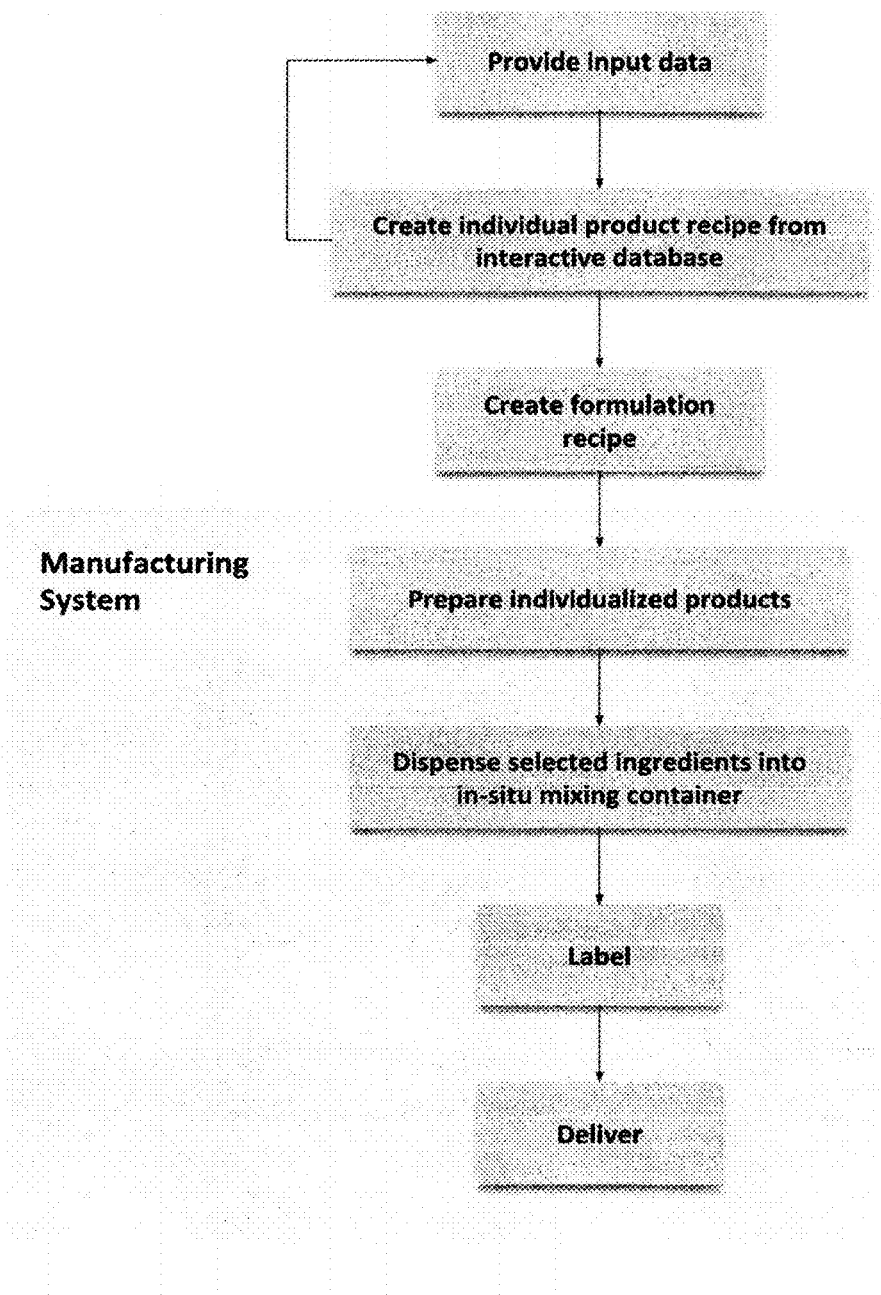
FIG. 2 is a block schematic for a method of operation thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, which is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

For purposes of the present invention, "health and beauty" products are to be broadly construed as health product or beauty product, interchangeably, or their equivalent. By way of example, and not meant as a limitation, any topical agent for hair, skin or nails, as well as medicaments, vitamins, supplements, nutritional products, sports or energy drinks or any similar or equivalent consumer product.

For purposes of the present invention, the terms "personalized" or "customized" and/or "made-to-order" should be construe as broadly and interchangeably, and independent of channel. By way of example, and not meant as a limitation, a direct to consumer channel, or a business-to-business supplier or sub-branding should all be construed as similar or equivalent for purposes of the present disclosure.

For purposes of the present invention, "labelling" and/or "engraving" are to be broadly construed in any similar or equivalent manner of "marking" information.

1. Detailed Description of the Figures

The best mode for carrying out the invention is presented in terms of its preferred embodiment, herein depicted within the Figures, wherein a process for the preparation and purchase of individualized cosmetics, generally noted as 10, is shown according to the preferred embodiment of the present invention. The system 10 includes: a customer interface 20; a formulation module 30; a production application programming interface (API) 40; a production system 50; and a distribution system 60.

The customer interface 20 may provide a user interface 22 that allows a customer 24 to input user preferences associated with the customization of an intended product 100. The use interface 22 may be part of a retail location such as a store or kiosk, or, as shown, facilitated on a portable computing device communicating through the internet to the formulation module 30. The specific physical embodiment of the customer interface 20 should not be considered limiting of the present invention, but rather should be broadly construed to any functional equivalent in which the customer 24 may input user preferences 26 from selecting of a particular product for purchase, interacting with a quiz or learning algorithm, interacting with a virtual advisor, or any functionally equivalent method for accessing a formulation database 32 in as interactive manner as necessary with the formulation module 30 in order to create an individual recipe 34.

The customer interface 20 may be in remote communication with the formulation module 30, such as via a local area network or wide area network. Preferably, the customer interface 20 may communicate with the formulation module 30 via internet communication. The process indents to allow for active participation in the creation of recipes that can be kept secret from or unavailable to (i.e., from other customers) or alternatively available and offered to other customers.

The formulation module 30 may provide operative communication with the formulation database 32. The inputting and receipt of user preferences 26 may be accessed iteratively with the database 32 by a quiz format (i.e., question or prompt to user 24 for an answer) in order to facilitate a personalized formulation. Personalized formulation for a health and beauty product may comprise prompts for a number of different parameters, both user oriented and ingredient oriented. By way of example, and not meant as a limitation, in the formulation of shampoo or body lotion the parameters for formulation may include hair type, texture, hair density, scalp moisture, treatment (color/bleach, etc.), hair goals (color, volume, rescue, heat protection, etc.).

Similarly, in the formulation of a vitamin or medicament the parameters for formulation may include age, body weight, health factors or similar parameters.

Upon completion a detailed formulation 34 in a form including customer data and formulation recipe may be communicated to the manufacturing API 40. Additionally, a customer profile or similar customer identifier may be added to the database 32 allowing a customer 24 to easily re-order for subsequent purchases and/or provide an interface starting point for alteration during subsequent visits.

The production application programming interface 40 receives the production data and communicates the same with the production system 50 and the distribution system 60. The production system 50 may receive the formulation recipe for operational control of an automated manufacturing cell 52. The manufacturing cell 52 may be a robotic cell to enable mass customization of skincare products. According to one aspect of the present invention, a single arm or multi-arm robot 54 may autonomously managing production by precisely measuring and mixing ingredients. Dosing systems 56 may include peripheral functions (i.e., dosage, pipes, stirrer). According to another aspect of the present invention, the sequential adding of ingredients may be substituted with an injection system allowing the simultaneous adding of ingredients (that means several bottles filled with ingredients at the same time) and arranged linearly in order to increase filling speed. In an exemplary production process, the robot 54 may grab product packaging bottles one at a time and pipetting and dosing of the different ingredients required for the individual recipe. After stirring, the bottle may be staged to a labeling and packaging cell 60 where the recipe information is used to generate an individual label 62 that is applied to the bottle to create a finished product 100 that may be conveyed to packaging and distribution.

The system utilizes an algorithm to gather all ratios of ingredients, saves the recipe, and sends it to production. The system 10 also invites the customer to choose the final amount of the cosmetic product (e.g., tester, small, medium, large sizes). The automated manufacturing cell receives data and information and creates the cosmetic product based on the data received. For container selection, all ingredients may be dosed, closed and mixed, based on the valid recipe and selected dose size. Computer control enables execution of the whole process.

The system allows the customer to design custom labels 62 for the products. When mixing is done, the system prepares the product for labelling. The label may include the principal brand and images or other contents other available databases and saves all data regarding the custom designed cosmetic products in a database. It is possible to correct a saved recipe if it is selected again and save the corrected recipe as a new recipe in the database. This allows saving created recipes for a product in the database, from which it is possible to re-prepare the cosmetic product and to fill the packaging, as well as to the correct recipes for individualized cosmetic products.

The detailed recipe formulation 34 may travel throughout the manufacturing, packaging and distribution processes through, for example, a unique QR Code 90 that allows all necessary information to travel through the system from selection to production to distribution. An individual consumer is thereby enabled to create a custom product specifically formulated to their selection. By analyzing a user's skin, hair or health; millions of formula variations may be created depending on ingredients, concentration and individual needs. The algorithm 30 manages level of concentration and ratio between ingredients.

The robotic system is capable of quickly blending ingredients in an economical manner while fully automating the process of ordering, filling and labeling of cosmetics products (but not limited to it), each in small volume customized for a consumer or customer. Such a manufacturing system allows for mass customization of beauty care and health products, interconnecting the three complex elements digitization, automation and robotization.

Advancements of the present system are created in a number of areas. Dosage of a base formula is enabled with pusher nitrogen that can dispense liquid ingredients. For the thicker consistencies to produce body milks and creams, additional dosing solution are provided adapted to work for different viscosities. Since pipetting dosing has proven to be unreliable for exact dosage quantity, in order to ensure high reliability of the exact amount of additives (concentrates) the use of volumetric pumps allow for dispensing additives in connection with the overpressure in the dispenser dishes. Mixing using contact mixer and vibration mixing fail to adequately function with smaller volumes and thicker consistencies. As such, a packaging with an integrated mixer may be utilized in production. When such packaging is filled with base and additives, the packaging is closed, and mixing will be carried out by the integrated mixer within the packaging/bottle.

As disclosed in greater detail in the Related Applications, the mixing system inside the bottle may allow filling of the bottle without contamination of the dispensing inlets. The use of an integrated mixer provides a substantial distribution of substances throughout the volume of the base while not increased the cost of the bottle significantly. Such an in-package mixing system also allows the bottle to be completely emptied (i.e., the emptying system may be squeezed to dispense more of the contents of the bottle than standard pipette systems allow). In-package mixing also allows for accurate dosing of creams, avoidance of contamination of the edge of the inlet opening of the bottle cap and easy replacement of transport packaging. These improvements ensure constant operation of the device, or short-term stoppages when changing packaging units.

While the mixing may be in a container first, different filling mechanism are envisioned in order to adapt the present invention for the filling of capsules or pressing of pills, or into very small size bottles (e.g., 6-packs for energy shots).

By formulating a specific recipe with additive dosing into individual containers directly, the system allows for the use of very small minimum amounts of additives and avoids contamination of the edge of the inlet opening on the bottle cap.

The dosing system of a base formulation may utilize a piston to push contents into the bottle. The bottle may be weighed to determine the intended number of piston cycles for the necessary volume. For autonomy of operation and ease of handling, separate formulation bases may have separate storage. The dosing of additional additives into the base formulation may therefore be done with a volumetric micro motor driven pump. With container volumes being small, less than 0.5 or 1 L, the exact amount of additives may be pumped in proportion to the speed of the pump's motor drive.

Once the additives are combined to the base, the completed product may be mixed within the bottle with a piston pusher with holes that will allow the contents to pass to the opposite side of the piston, and the transitions will mix. Such a mixing container is described in greater detail within the Related Applications, which are incorporated by reference as if fully rewritten herein. This mixing mechanism will also be used to discharge the contents through the funnel onto the bottle cap.

The robotic cell 52 may be able to produce creams that, due to the very difficult liquid base, can only be mixed with a mechanical mixer. The mechanical mixing method has the disadvantage of leaving a large part of the substance on the mixer, which means that there is a lot of waste in small mixing volumes. A major problem is also the cleaning of the mixing system after each change of ingredients. For the personalized way of making cosmetics such conventional systems cannot be used. Consequently, the use of a bottle that has an integrated mixer resolves such deficiencies. Further, because highly viscous cream bases are difficult to dispense, accurate dosing in a 30-50 ml bottle prior to mixing of additives further resolves such difficulties.

The bottle may be made of plastic material of round or square shape with oval edges. A square shape is more optimal in terms of space utilization and more suitable for laser marking. A piston pusher with holes provides in package mixing and allows the contents to pass to the opposite side of the piston for mixing. Further, the piston style mixing mechanism may also be used to squeeze the contents through the funnel on the bottle cap.

The dosing of the additives may be done with a volumetric micro motor driven pump. The container is a container of volumes 0.5 and 1 l (but not limited to it). The pump provides the exact amount of accessories in proportion to the speed of the motor drive.

2. Operation of the Preferred Embodiment

In operation the present system allows for a scalable business making customized products using a large number of ingredients with rapid reconfiguration for high-speed manufacturing. High speed, autonomous on-demand production will enable made-to-order formulae that are affordable and a business that can be scaled benefiting the consumer as well as the health, beauty, medical, food, and other related industries. A scalable and autonomous on-demand production for made-to-order skincare products allows for a unique formula for each single consumer. A complete end-to-end technology solution for made-to-order beauty care and health products enabling consumers to mix their own formula to create a customized beauty product for their individual needs as well as enabling private label customers to rapidly create their own beauty care, nutrition or health product line (and own brand) without the financial burden of minimum order quantities and lengthy formulation processes. On-demand manufacturing provides a holistic supply chain solution to private label customers that eliminates costs of inventory and price competition while enabling a more personalized service that drives customer loyalty.

The innovation consists of two technology solutions that are fully integrated. The first is a robotic cell to enable mass customization of cosmetics, nutrition and health products. Such integration allows for the autonomous management of production, precise mixing of ingredients, and automated filling and branding. The second includes an advanced algorithm that enables consumers and private label customers to create their custom products via a smart factory. By analyzing a user's skin, hair and/or health, millions of formula variations may be created depending on ingredients, concentration, and individual needs. The process automation and algorithm manage level of concentration and ratio between ingredients and the robotic system quickly blends ingredients in an economical manner while fully automating the process of ordering, filling and labeling of beauty care, nutrition and health products, each in small volume customized for a consumer or private label customer.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A system for scalable selection and preparation of a plurality of individualized health or beauty products comprising:
   a customer interface adapted for receiving specific personal or product attributes through an interactive selection process at an on-line or retail location;
   a formulation module having a controller in communication with the customer interface for receiving the specific personal or product attribute and creating an individual product recipe based on the personal or product attributes and a database of ingredients;
   a production application programming interface (API) receiving the individual product recipe and creating a detailed production formulation through the controller;

a production system implementing the detailed production formulation in an automated, on demand production cell in which ingredients are sequentially dosed into a container system adapted for directly dosing, mixing, and blending a product within a final retail package, said container system further comprising:
a housing forming the final retail package;
integrated mixer accessing the housing through a bottom, wherein the integrated mixer comprises a mixing plate with at least one hole situated in an outer part of the mixing plate, and wherein the mixing plate is capable of rotating around a rod with a rotational movement simultaneously with an upward or downward movement, and wherein the bottom is movable and facilitates the production of a vacuum or an air-free space within the housing; and
a distribution system delivering each individualized health or beauty products within the container, incorporated directly in its entirety into the final retail package, to a customer; wherein mixing of sequentially dosed ingredients occurs after the container is sealed and the same container that forms a final user packaging.

2. The system of claim 1, wherein manufacturing control, labeling, laser engraving, packaging and compliance traceability are each codified, tracked, traced and saved by the production system.

3. The system of claim 1, wherein the customer interface comprises a portable computing device receiving input user preferences from an interactive prompt accessed from a formulation database and communicated through a communication network between the portable computing device and the formulation module.

4. The method for mass-customization production of a manufactured product using the system for the selection and preparation of individualized health or beauty products of claim 1, the method comprising:
creating an individual product recipe from an interactive ingredient database, wherein ingredients are identified in relation to selected specific person or product attributes;
manufacturing a detailed production formulation related to the individual product recipe;
dosing selected ingredients of the detailed production formulation into the container;
sealing and mixing the container;
labeling the container in a final user packaging; and
distributing the final user packaging to a user or private label customer.

5. The process for the mass production of a personalized formulation of claim 4, wherein manufacturing control, labeling, packaging and compliance traceability are all codified, tracked, traced and saved through the individual product recipe.

6. The method of claim 4, wherein the manufactured product is selected from a group consisting of: health products; beauty products; cosmetics; medicaments; vitamins; and performance drinks.

7. The method of claim 4, wherein the ingredients are in a form selected from the group consisting of: liquids; creams; high Newtonian fluids; and non-Newtonian fluids.

8. A process for selection and manufacturing of an individualized multi-ingredient product comprising:
providing a manufacturing system comprising:
an input terminal comprising a user interface configured to acquire input data associated with a user from the user; and
an interactive database for storing the input data, a group of predetermined ingredients, and a group of predetermined recipes;
a controller for creating a formulation recipe from the interactive database;
an automated manufacturing cell for dispensing the ingredients of the formulation recipe into an in-situ mixing container; and
a marking device for marking a label or the container;
providing the input data to the manufacturing system via the user interface to create an individual product recipe from the interactive database, wherein ingredients are identified in relation to selected specific person or product attributes based on the input data;
providing the formulation recipe to the manufacturing system;
preparing an individualized cosmetic product in a container adapted for final consumer usage having an integrated mixer based on the formulation recipe, wherein ingredients of the formulation recipe are dosed directly into the container then sealed and mixed by manipulating the integrated mixer;
marking the label or the container based on the input data in a manner that functions as a final consumer package; and
delivering the individualized cosmetic product adapted for final consumer usage within a final consumer package to the user;
wherein the final consumer package is adapted for directly dosing, mixing, and blending an individual product within a final retail package further comprising:
a housing forming the final retail package; and
integrated mixer accessing the housing through a bottom, said integrated mixer for said mixing in a simultaneous rotational and reciprocal motion, and wherein said bottom is movable and facilitates the production of a vacuum or an air-free space within the housing where the mixing of ingredients occurs by the integrated mixer.

9. The process of claim 8, wherein the input terminal comprises a portable computing device communicating interactively through a communication network with the interactive database.

10. The process of claim 9, wherein the step of creating an individual product recipe comprises:
creating a new recipe or selecting a recipe from the group of predetermined recipes;
reviewing the recipe;
optionally amending the recipe;
storing the amended recipe; and
associating the amended recipe with a user or customer profile.

11. The process of claim 10, further comprising storing the recipe in the manufacturing system in a user profile.

* * * * *